(12) United States Patent
Jo et al.

(10) Patent No.: US 10,142,005 B2
(45) Date of Patent: Nov. 27, 2018

(54) BEAMFORMING TRAINING

(71) Applicant: LG ELECTRONICS INC., Seoul (KR)

(72) Inventors: Kyungtae Jo, Seoul (KR); Hangyu Cho, Seoul (KR); Jinmin Kim, Seoul (KR); Sungjin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/341,940

(22) Filed: Nov. 2, 2016

(65) Prior Publication Data
US 2017/0126303 A1 May 4, 2017

Related U.S. Application Data

(60) Provisional application No. 62/249,364, filed on Nov. 2, 2015, provisional application No. 62/252,446, filed on Nov. 7, 2015, provisional application No. 62/252,424, filed on Nov. 7, 2015, provisional application No. 62/278,461, filed on Jan. 14, 2016.

(51) Int. Cl.
*H04B 7/06* (2006.01)
*H04B 7/0417* (2017.01)
*H04L 5/00* (2006.01)
*H04W 84/12* (2009.01)

(52) U.S. Cl.
CPC ......... *H04B 7/0684* (2013.01); *H04B 7/0417* (2013.01); *H04B 7/0617* (2013.01); *H04B 7/0621* (2013.01); *H04L 5/0055* (2013.01); *H04W 84/12* (2013.01)

(58) Field of Classification Search
CPC .. H04B 7/0617; H04B 7/0621; H04B 7/0695; H04B 7/088; H04B 7/0684; H04L 5/0055; H04W 16/28
See application file for complete search history.

(56) References Cited

U.S. PATENT DOCUMENTS

| 2015/0244432 A1* | 8/2015 | Wang | H04B 7/0695 375/267 |
| 2015/0333894 A1* | 11/2015 | Wang | H04L 5/0073 370/329 |
| 2016/0190686 A1* | 6/2016 | Gao | H01Q 3/24 342/374 |

(Continued)

OTHER PUBLICATIONS

Eldad Perahia and Carlos Cordeiro, IEEE 802.11-11/04569r1, IEEE 802.11ad Overview for CWPAN, Intel Corporation, Mar. 2011.*

(Continued)

*Primary Examiner* — Aristocratis Fotakis
(74) *Attorney, Agent, or Firm* — Lee Hong Degerman Kang Waimey

(57) ABSTRACT

Provided are a method and apparatus for performing beamforming training in a wireless local area network. A responder receives a plurality of beacon frames in a plurality of TX sectors from an initiator during a transmission (TX) beamforming (BF) interval. The responder transmits a first sector sweep feedback for a first array antenna to the initiator during a reception (RX) beamforming (BF) interval. The first sector sweep feedback comprises a first antenna ID indicating a first array antenna and a first TX ID indicating a TX sector selected for the first array antenna from the plurality of TX sectors.

12 Claims, 10 Drawing Sheets

(56) References Cited

U.S. PATENT DOCUMENTS

| | | | | |
|---|---|---|---|---|
| 2016/0323755 A1* | 11/2016 | Cordeiro | ............ | H04J 13/0014 |
| 2016/0380685 A1* | 12/2016 | Kasher | ................ | H04B 7/0617 |
| | | | | 370/329 |
| 2017/0079031 A1* | 3/2017 | Maltsev, Jr. | ...... | H04W 72/0446 |
| 2017/0085306 A1* | 3/2017 | Cariou | ................ | H04B 7/0452 |
| 2017/0118656 A1* | 4/2017 | Xin | ...................... | H04W 16/28 |
| 2018/0006689 A1* | 1/2018 | Da Silva | .............. | H04B 7/0456 |
| 2018/0123665 A1* | 5/2018 | Oh | ...................... | H04B 7/0617 |

OTHER PUBLICATIONS

Anique Akhtar and Sinem Coleri Ergen, "Efficient network level beamforming training for IEEE 802.11ad WLANs", KOC University Istanbul, Jul. 26-29, 2015, IEEE.*

* cited by examiner

FIG. 3

| L-STF | L-CEF | L-Header | EDMG-Header-A | EDMG-STF | EDMG-CEF | DATA FIELD | AGC | TRN |

BEAMFORMING TRAINING

CROSS-REFERENCE TO RELATED APPLICATIONS

Pursuant to 35 U.S.C. § 119(e), this application claims the benefit of U.S. Provisional Patent Application Nos. 62/249,364, filed on Nov. 2, 2015, 62/252,446, filed on Nov. 7, 2015, 62/252,424, filed on Nov. 7, 2015 and 62/278,461, filed on Jan. 14, 2016, the contents of which are all hereby incorporated by reference herein in their entirety.

BACKGROUND OF THE INVENTION

Field of the Invention

The present invention relates to a wireless communication system, and more particularly, to a method of performing beamforming training and an apparatus using the same.

Related Art

An IEEE 802.11ad standard is a very high-speed wireless communication standard that operates in a band of 60 GHz or above. Even though a signal can reach about 10 meters, the throughput may support 6 Gbps or more. Since the IEEE 802.11 ad standard operates in a high frequency band, signal propagation is dominated by ray-like propagation. As a transmit (TX) or receive (RX) antenna beam is arranged toward a strong spatial signal path, signal quality thereof may be improved.

The IEEE 802.11ad standard includes a beamforming training process for antenna beam alignment. To achieve throughput of 20 Gbps or more, a next-generation standard that is being developed on the basis of the IEEE 802.11ad is called as an IEEE 802.11ay. One of the key technologies of the IEEE 802.11ay is a multiple input multiple output (MIMO) beamforming technology through an array antenna. The IEEE 802.11ad as a conventional technology supports a single stream transmission using one array antenna, and a next-generation technology (e.g. IEEE 802.11ay) thereof supports multi-stream transmission using a plurality of antenna arrays.

To apply the plurality of array antennas, it is required that a plurality of independent beamformings are performed. However, this may cause severe interference between a plurality of streams and an increase of time required for the beamformings. A method will be proposed to minimize the interference between the streams and reduce the time required for the beamformings.

SUMMARY OF THE INVENTION

The present invention provides a method of performing beamforming training using a plurality of array antennas.

In an aspect, a method of performing beamforming training in a wireless local area network is provided. The method includes receiving, by a responder, a plurality of beacon frames in a plurality of TX sectors from an initiator during a transmission (TX) beamforming (BF) interval, and transmitting, by the responder, a first sector sweep feedback for a first array antenna to the initiator during a reception (RX) beamforming (BF) interval. The first sector sweep feedback comprises a first antenna ID indicating a first array antenna and a first TX ID indicating a TX sector selected for the first array antenna from the plurality of TX sectors.

The first sector sweep feedback may further include an RX ID indicating an RX sector selected by the responder.

In another aspect, an apparatus for performing multi-beamforming training in a wireless local area network includes a transceiver configured to receive and transmit a radio signal and a processor connected to the transceiver. The processor is configured to control the transceiver to receive a plurality of beacon frames in a plurality of TX sectors from an initiator during a transmission (TX) beamforming (BF) interval, and control the transceiver to transmit a first sector sweep feedback for a first array antenna to the initiator during a reception (RX) beamforming (BF) interval. The first sector sweep feedback comprises a first antenna ID indicating a first array antenna and a first TX ID indicating a TX sector selected for the first array antenna from the plurality of TX sectors.

In the MIMO system, it is necessary to perform an independent beamforming process for each array antenna about a plurality of streams. According to proposed embodiments, a transmission beamforming process and a reception beamforming process may be performed at the same time, thereby reducing the time for beamforming training.

BRIEF DESCRIPTION OF THE DRAWINGS

FIG. 3 is a diagram illustrating an example of a physical layer protocol data unit (PPDU) format for the proposed communication.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user.

A Basic service set (BSS) is a building block of the wireless local area network (WLAN) based on the IEEE 802.11 standard. The BSS may include a plurality of STAs which perform direct communication with each other. The WLAN may provide two types of sets, for example, independent BSS (IBSS) and personal BSS (PBSS). The IBSS may be a basic type. The PBSS may be a type of wireless local area network (WLAN), in which the respective STAs communicate directly with each other, as an ad-hoc network. A STA in the PBSS may perform a role of the PBSS control point (PCP). The PCB may provide a beacon transmission, a service period (SP) allocation, etc.

An access point (AP) may be an entity which provides a connection (or association) between multiple BSSs. One STA in the PBSS may perform a role of the AP and another STA that belongs to different BSSs may communicate through the AP. The AP may manage the beacon transmission and association (or association response). Hereinafter, the AP and the PCP, which are not divided separately, may be referred to as a "AP".

The STA may include non-AP STA or AP unless a STA function and an AP function are divided separately. When a communication between the STA and the AP is described, the STA may be interpreted as the non-AP STA. When a communication between a STA and a STA is described or when the AP function is not required separately, the STA may be the non-AP STA or the AP.

Figure 1:
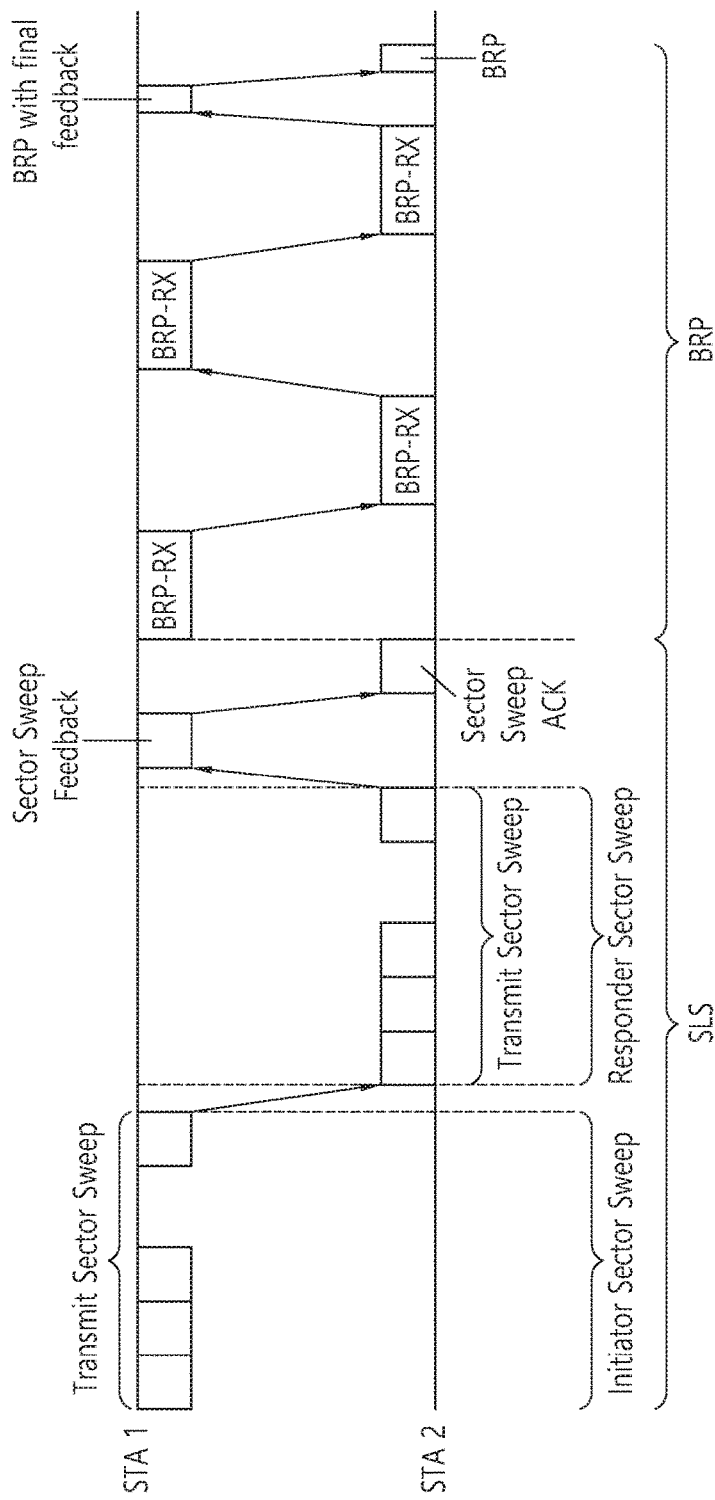
FIG. 1 is a diagram illustrating a beamforming training process according to the related art.

FIG. 1 is a diagram illustrating a beamforming training process according to the related art. This may refer to section 9.35 of the IEEE 802.11ad standard.

A STA1 may be an initiator that initiates beamforming (BF) training. A STA2 that participates in the BF training may be a responder.

The BF training provides a transmission of a BF training frame using a sector sweep (SSW) and a signaling required for each STA to determine setting an appropriate antenna system. The BF training process may include a sector level sweep (SLS) process and a beam refinement protocol (BRP) process. The SLS process for the sector sweep may allow communication between the STAs to provide a control physical layer (PHY). The BRP process provides a refinement of an antenna weight vector between the transmitter and the receiver.

The BF training may be initiated by the initiator from the SLS process. The SLS process may include an initiator sector sweep (ISS) for training an initiator link, a responder sector sweep (RSS) for training a responder link, a sector sweep (SSW) feedback, and a SSW ACK.

During the ISS process, the initiator may transmit each frame (a beacon frame or a SSW frame) to each of the sectors which the initiator has. During the RSS process, the responder may transmit each of the SSW frames to each of the sectors which the responder has. During the SSW process, the initiator may send a SSW feedback frame to the responder. The SSW feedback frame may include information about a sector and an antenna which are selected by the initiator. The SSW ACK frame may be transmitted through a sector included in the SSW feedback frame which is most recently received and the antenna.

A sector may correspond to a specific antenna beam or pattern. A transmit (TX) sector may be a sector for a TX antenna, and a receive (RX) sector may be a sector for a RX antenna.

A sector (a TX sector and/or a RX sector) in which an initiator has the best quality and a sector (a TX sector and/or a RX sector) in which a responder has the best quality may be determined through the SLS process.

When the SLS process is completed, the BRP process for training an RX antenna array and a TX antenna array may be initiated. The BRP process may include a BRP setup subphase, a multiple sector ID detection (MID) subphase, a beam combining (BC) subphase, and the like.

Figure 2:
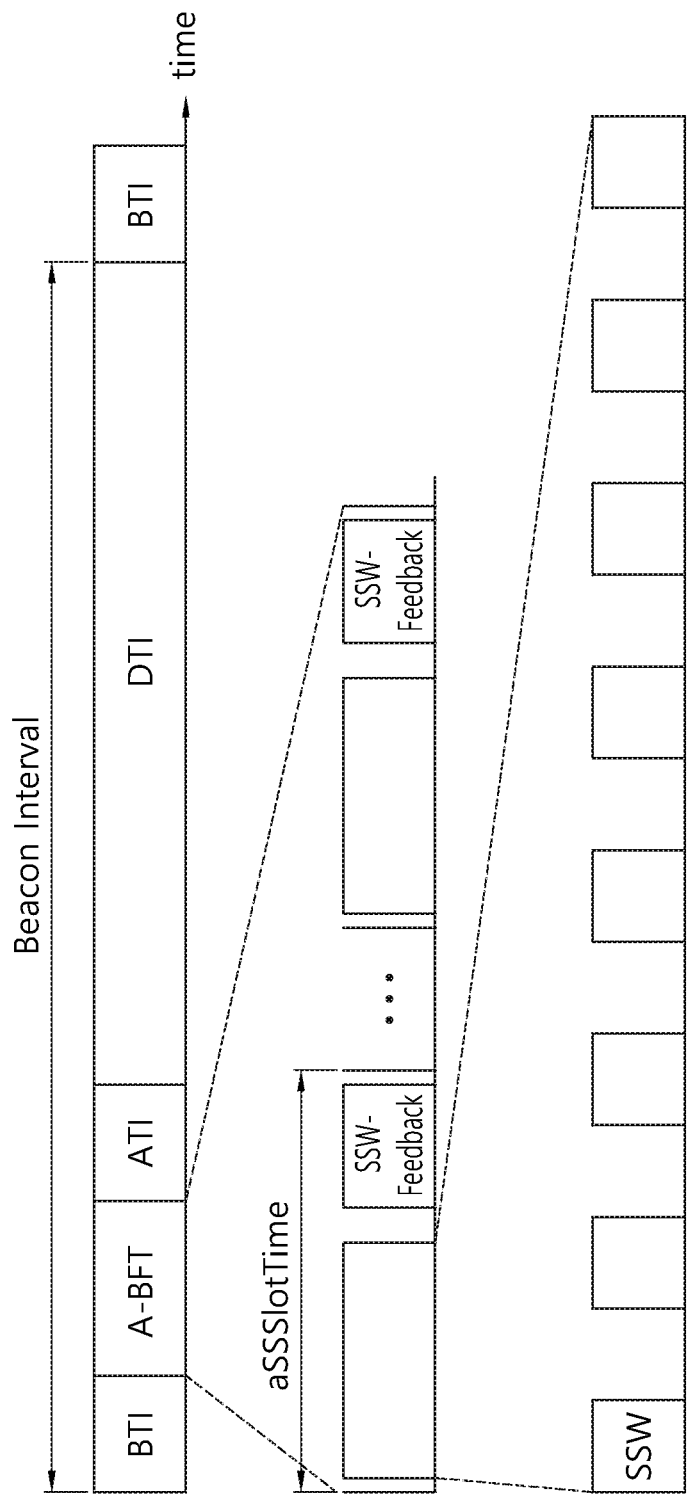
FIG. 2 is a diagram illustrating an example of a SLS process.

FIG. 2 is a diagram illustrating an example of a SLS process.

When an initiator is an AP and a responder is a non-AP STA, a beacon frame may be transmitted during the ISS process. A beacon interval may be a time period in which a beacon frame is transmitted.

A beacon transmission interval (BTI) may be a time interval between the start of a first beacon transmission by the AP in a beacon interval to the end of a last beacon transmission by the AP in the same beacon interval. An association beamforming training (A-BFT) may be a time period including a responder sector sweep (RSS) and a SSW feedback in the SLS process for beamforming (BF). An announcement transmission interval (ATI) may be a time interval for a request-response based management between the AP and the STA. A data transfer interval (DTI) may be a time interval for exchanging data.

The A-BFT is performed by a SSW slot unit, and a length of the A-BFT is defined as an integer multiple length of the SSW slot. A-BFT length information may be included in the beacon frame.

The SSW slot has a length of aSSSlotTime. The aSSSlotTime is defined as follows: aSSSlotTime=aAirPropagationTime+aSSDuration+MBIFS+aSSFBDuration+MBIFS. The aAirPropagationTime is a parameter considering the propagation delay between the initiator and the responder. The aSSDuration is a time for the responder to transmit M SSW frames in the SSW slot. Information about the number M of allowed SSW frames per a SSW slot may be included in the beacon frame. FIG. 2 is a diagram illustrating a case where M=8. Medium beamforming interframe spacing (MBIFS) represents an interval between the BTI and A-BFT or an interval between ISS, RSS, SSW feedback, and SSW ACK.

At the beginning of each A-BFT, the STA as the responder may invoke a random back-off process to start or resume the RSS. At the beginning of the A-BFT, the STA may randomly select a backoff count from a uniform distribution [0, (A-BFT length-1)]. The STA decrements the backoff counter by one at the end of each SSW slot. The STA initiates RSS in the corresponding SSW slot when the back-off count value is 0 at the start of the SSW slot. In the corresponding SSW slot, the STA may transmit a maximum of M SSW frames. If there are more SSW frames sent by the STA, the RSS may be resumed in the next SSW slot before the A-BFT is finished. If the RSS is not completed before the A-BFT is finished, the backoff process may be performed again before the RSS is resumed in the next A-BFT.

The AP may send a SSW feedback before the SSW slot expires. The information included in the SSW feedback may be based on the SSW frame received in the SSW slot where the SSW feedback is transmitted. The SSW feedback may include information about a sector and an antenna which are selected by the AP.

The STA has an RSS fail count. Although the RSS fail count is performed during an A-BFT(s) period, the RSS fail count may be the number of consecutive times which do not receive the SSW feedback as a response. For example, it may be assumed that an A-BFT period has 8 SSW slots and the STA transmits SSW frames in 4 SSW slots for 2 A-BFT periods. If the STA does not receive the SSW feedback from 3 SSW slots of 4 SSW slots, the value of the RSS fail count may be 3.

When the value of the RSS fail count exceeds the RSS retry limit, the STA may select a random value selected from the uniform distribution [0, RSSBackoff) as a backoff count. The STA may decrement the backoff count by 1, one by one at the end of each A-BFT. When the backoff count reaches zero, the STA may resume the RSS in the A-BFT. When the STA receives the SSW feedback during the A-BFT, the RSS fail count may be set to zero.

FIG. 3 is a diagram illustrating an example of the PPDU format for the proposed communication.

A Physical layer protocol data unit (PPDU) is a data block exchanged in two physical (PHY) entities. The PPDU may be also referred to as "enhanced directional multi-gigabit (EDMG) PPDU" to distinguish from an existing 802.11 b/g/n/ac based PPDU.

The EDMG PPDU may include a legacy short training field (L-STF), a legacy channel estimation field (L-CEF), a legacy header field (L-Header), an EDMG header A field (EDMG-Header-A), EDMG short training field (EDMG-STF), EDMG channel estimation field (EDMG-CEF), data field, automatic gain control field (AGC), and training sequences field (TRN). All fields may be not required. Some fields may be omitted and other fields may be added. For example, an EDMG-Header-B field next to an EDMG-CEF may be added.

L-STF may be composed of 16 times repetition of the sequence $Ga_{128}(n)$ of length 128 is defined as follows.

$$r_{STF}(nT_c) = \begin{cases} (Ga_{128}(n \bmod 128))\exp\left(j\pi\frac{n}{2}\right) & n = 0, 1, \ldots, \\ & 16 \times 128 - 1 \\ (-Ga_{128}(n \bmod 128))\exp\left(j\pi\frac{n}{2}\right) & n = 16 \times 128, \ldots, \\ & 17 \times 128 - 1 \end{cases} \quad \text{[Equation 1]}$$

L-CEF is used for channel estimation. The L-Header may include information about the reception of the data field. The L-Header may include an indication of the modulation and coding scheme (MCS), the length of the payload in the data field, and/or the presence of the EDMG-Header-A. The data field may include data for the user.

The EDMG-STF may be transmitted in one or more spatial streams, and the structure of the EDMG-STF may be varied according to the number of channels used. The EDMG-CEF may be transmitted in one or more spatial streams, and the structure of the EDMG-CEF may be varied according to the number of channels used.

The EDMG-Header-A may include a format field, a bandwidth field, and stream information. The format field indicates whether the corresponding PPDU is a single user PPDU or a multi-user (MU) PPDU. The bandwidth field indicates a bandwidth in which the corresponding PPDU is transmitted. The stream information indicates the number of spatial streams which are allocated to a receiving STA.

According to the conventional IEEE 802.11ad based beamforming process, an initiator may send a beacon frame with information about all sectors during a beacon transmission interval (BTI) of the sector level sweep (SLS). Moreover, during an association beamforming training (A-BFT), a responder may send an SSW frame with information about the best sector to the initiator. Moreover, the initiator and the responder may share the information about a sector and a beam which are finally selected using an SSW feedback.

IEEE 802.11ay, which is being discussed now, is considering multiple input multiple output (MIMO) support through array antennas. Furthermore, a support for multi user-multiple input multiple output (MU-MIMO) is also being discussed. In this case, BF training through a single array antenna of the existing IEEE 802.11 ad may be inefficient.

Below, beamforming techniques suitable for a system having multiple array antennas and multiple streams are proposed. Beamforming for a single user MIMO (SU-MIMO) environment is considered between one initiator and one responder. Beamforming for the MU-MIMO environment is also considered between one initiator and multiple responders. In the SU/MU-MIMO environment, when different array antennas (or different responders) select the same sector as the best sector, a collision situation may occur and may be considered.

Each transmitting terminal may include one or more RF chains. The array antennas of the transmitting terminal may transmit one or more beams at the same time. One or more channels that are used for beam transmission may be defined. The array antennas may perform beamformings at the same time through one or more channels. The channels may be bonded.

Hereinafter, the beam forming process may be a part of the SLS process, and a Beam Refinement Protocol (BRP) process may be performed after the SLS process is completed. Hereinafter, an initiator may be an access point (AP) and a responder may be a station (STA). However, embodiments are not limited thereto. One responder may have K (K>=1) array antennas.

Figure 4:
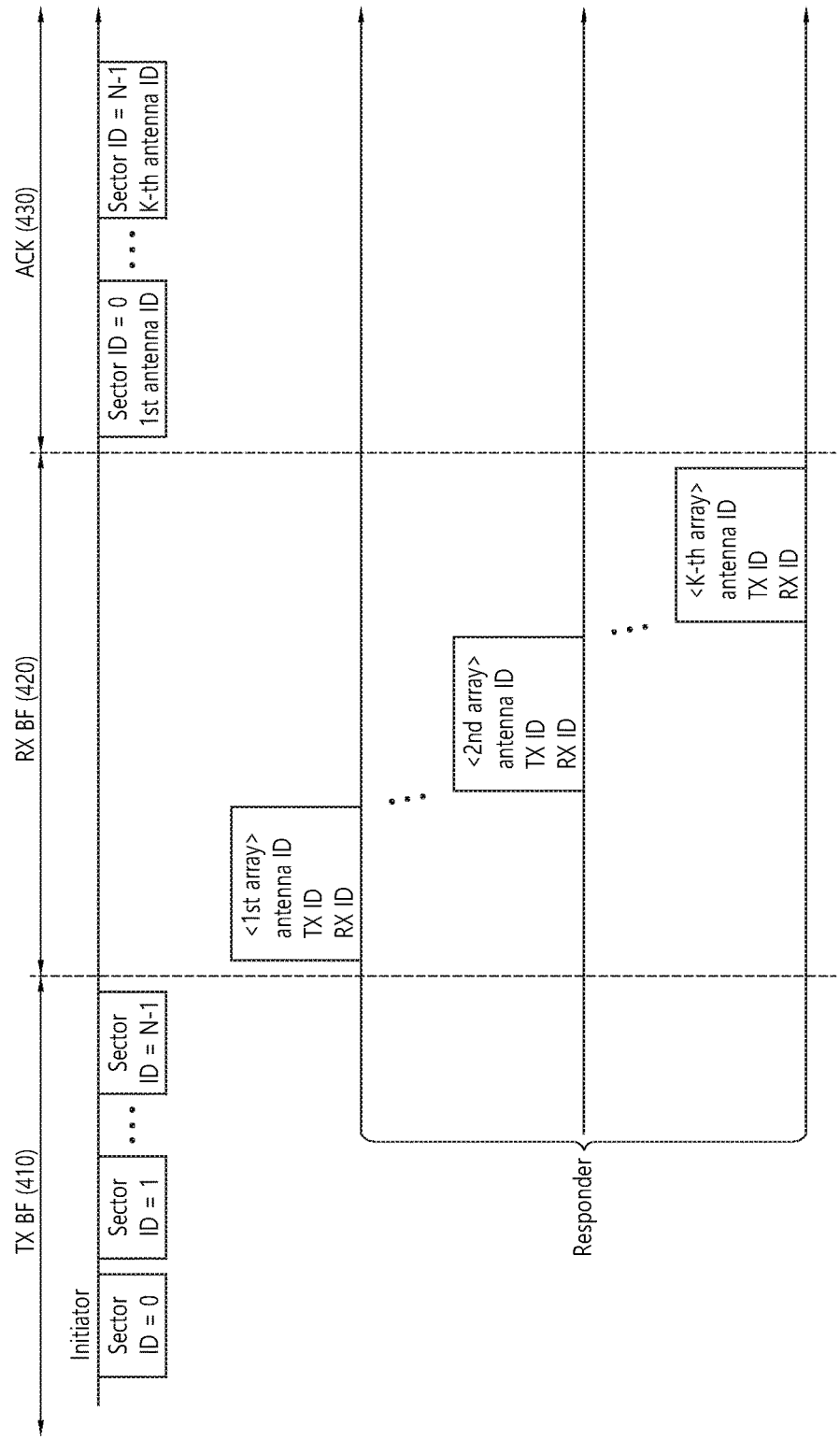
FIG. 4 is a diagram illustrating a beamforming (BF) process according to an embodiment of the inventive concept.

FIG. 4 is a diagram illustrating a beamforming (BF) process according to an embodiment of the inventive concept.

The SLS process of the beamforming process may include a transmission (TX) BF interval 410, an reception (RX) BF interval 420, and an ACK interval 430.

The TX BF interval 410 may correspond to the beacon transmission interval (BTI). During the TX beamforming interval 410, the initiator may transmit a beacon frame (or SSW frame) for all sectors. When there are N sectors with sector IDs of 0 to N−1 respectively, the initiator may transmit a beacon frame in each sector.

During the RX BF interval 420, the responder may sequentially or simultaneously transmit sector sweep feedbacks through array antennas respectively. A sector sweep feedback may include TX and/or RX beamforming information about the corresponding array antennas. The sector sweep feedback may be included in the SSW frame. Table 1 is an example of fields included in the sector sweep feedback. All the fields may not be required and a specific field may be omitted or added.

TABLE 1

| Fields | Description |
| --- | --- |
| Antenna ID | An ID of an array antenna that uses to be received by a responder. Alternatively, the antenna ID may refer to as "an ID of the array antenna in which a current sector sweep feedback is transmitted by the responder". |
| TX ID | A TX ID indicates a TX sector, which is selected by the responder, from among sectors received from corresponding array antennas during the TX BF interval. A sector having the best qulaity may be selected. |
| RX ID | An RX ID indicates an RX sector which is selected by the responder. When the initiator transmits a beam in the selected TX sector, an RX sector which is expected to have best reception quality may be selected. |

During the ACK interval 430, the initiator may transmit a sector sweep ACK for each sector. The sector sweep ACK may include a sector ID and an antenna ID. The sector ID indicates a sector (i.e., TX sector) to which a corresponding sector sweep ACK is transmitted. The antenna ID indicates an array antenna of a responder selected from a corresponding sector. An order of receiving the sector sweep feedback may follow the order in which the initiator transmits a frame transmitted during the TX BF interval (e.g., a beacon frame or sector sweep frame) or the order in which the initiator and responder are mutually agreed.

According to proposed embodiments, ISS and RSS may be performed at a time during the SLS. That is, during the SLS, an array antenna and RX sector of the responder corresponding to a TX sector of the initiator may be selected. Since an additional A-BFT is not required and only the detailed tuning of the TX and RX sectors is performed during the subsequent BRP, the time for beamforming training may be greatly reduced.

Figure 5:
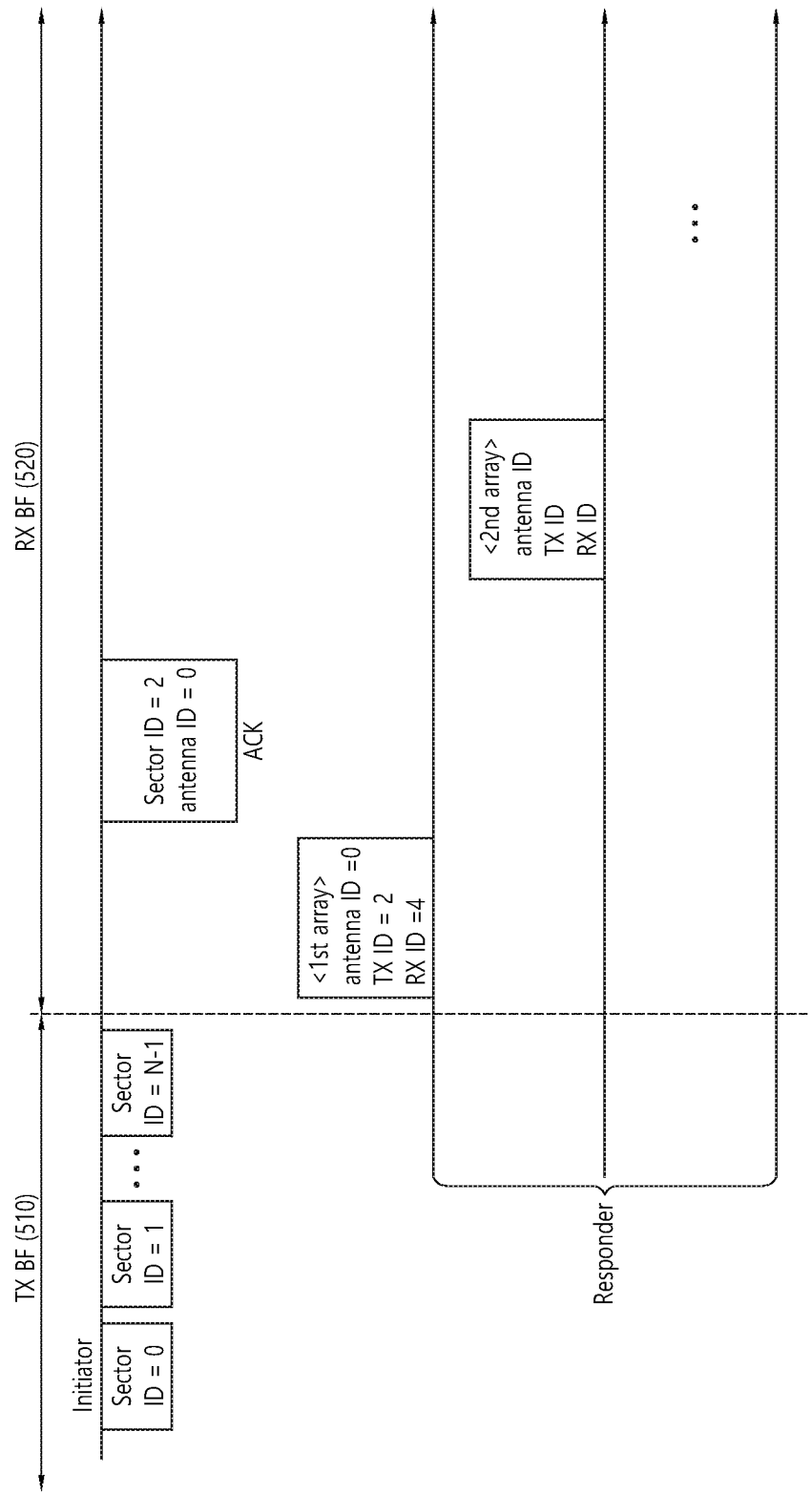
FIG. 5 is a diagram illustrating a beamforming process according to another embodiment of the present invention.

FIG. 5 is a diagram illustrating a beamforming training process according to another embodiment of the present invention.

Compared with an embodiment of FIG. 4, a sector sweep feedback and a sector sweep ACK may be exchanged during an RX BF interval 520, without a separate ACK interval.

During a TX BF interval 510, the initiator may transmit a beacon frame (or SSW frame) across all sectors.

During the RX BF interval 520, the responder may sequentially or simultaneously transmit sector sweep feedbacks for array antennas. A responder in which a sector sweep feedback is received may transmit a sector sweep ACK in the selected TX sector. For example, a first sector sweep feedback which is first transmitted may have an antenna ID=0, TX ID=2, and RX ID=4. The initiator may send a sector sweep ACK with sector=2 and antenna ID=0. The above procedure may be repeated for each array antenna.

Figure 6:
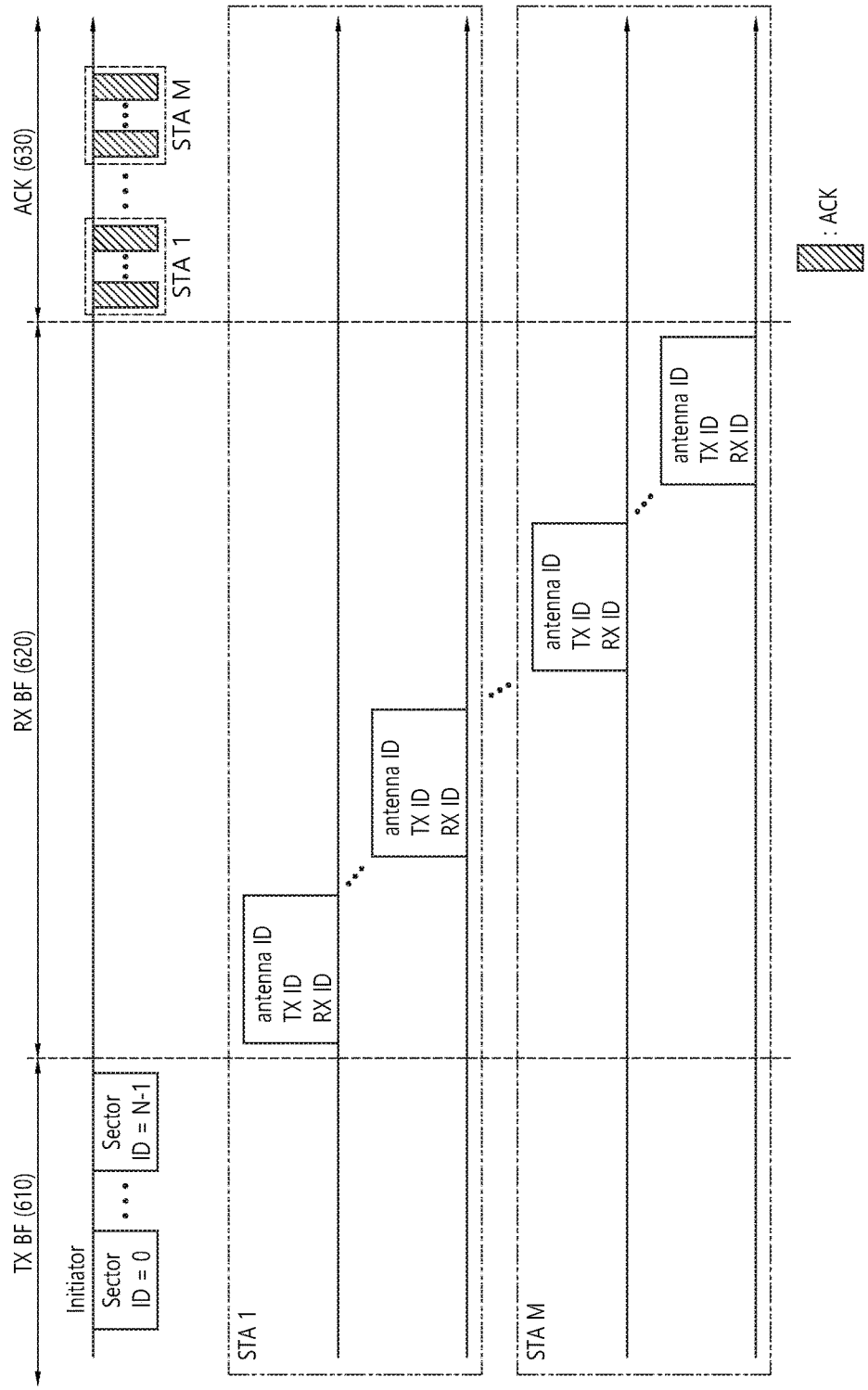
FIG. 6 is a diagram illustrating a beamforming process according to another embodiment of the present invention.

FIG. 6 is a diagram illustrating a beamforming training process according to another embodiment of the present invention.

This is an embodiment which is applied to M (M>1) responders with reference to FIG. 4. During a TX beamforming interval 610, the initiator may transmit a beacon frame (or SSW frame) across all sectors. During an RX BF interval 620, each responder may sequentially or simultaneously transmit sector sweep feedbacks for array antennas. During an ACK interval 630, the initiator may sequentially or simultaneously send sector sweep ACKs to respective responders.

Figure 7:
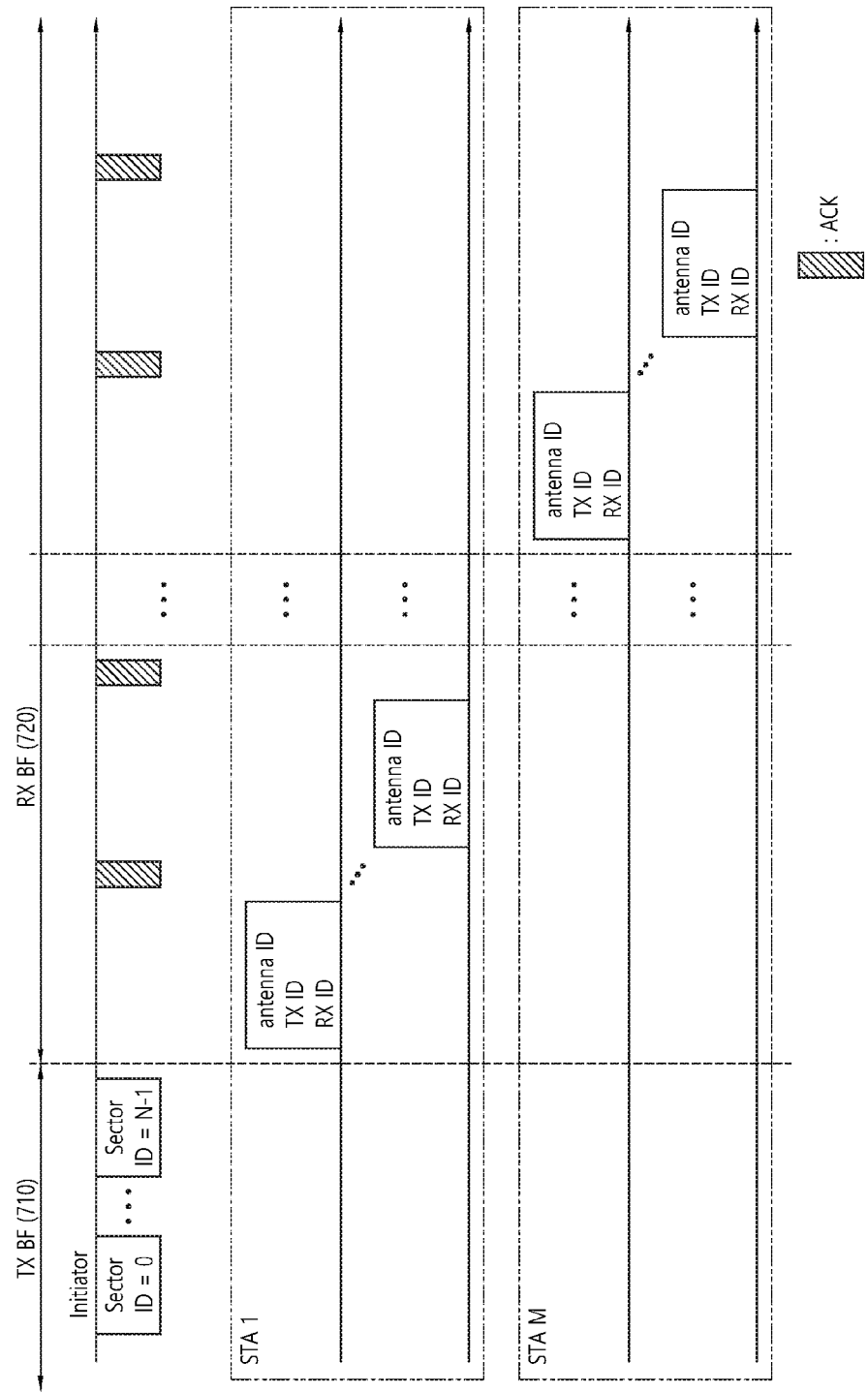
FIG. 7 is a diagram illustrating a beamforming process according to another embodiment of the present invention.

FIG. 7 is a diagram illustrating a beamforming training process according to another embodiment of the present invention.

This is an embodiment which is applied to M (M>1) responders with reference to FIG. 5. During a TX beamforming (BF) interval 710, the initiator may transmit a beacon frame (or SSW frame) across all sectors. During an RX BF interval 720, the responder may sequentially or simultaneously transmits sector sweep feedbacks from array antennas. A responder in which a sector sweep feedback is received may transmit a sector sweep ACK to a corresponding responder from a selected TX sector.

The sector sweep feedback may specify an ACK type to be applied to the corresponding responder. The ACK type may include a scheduling ACK type (an embodiment of FIG. 4 or 6) in which the initiator sends sector sweep ACKs after all responders have sent sector sweep feedbacks, and an immediate ACK type (an embodiment of FIG. 5 or 7) in which the initiator sends a sector sweep ACK after one responder has sent a sector sweep feedback. The sector sweep feedback may include type information specifying the scheduling ACK type or the immediate ACK type.

Figure 8:
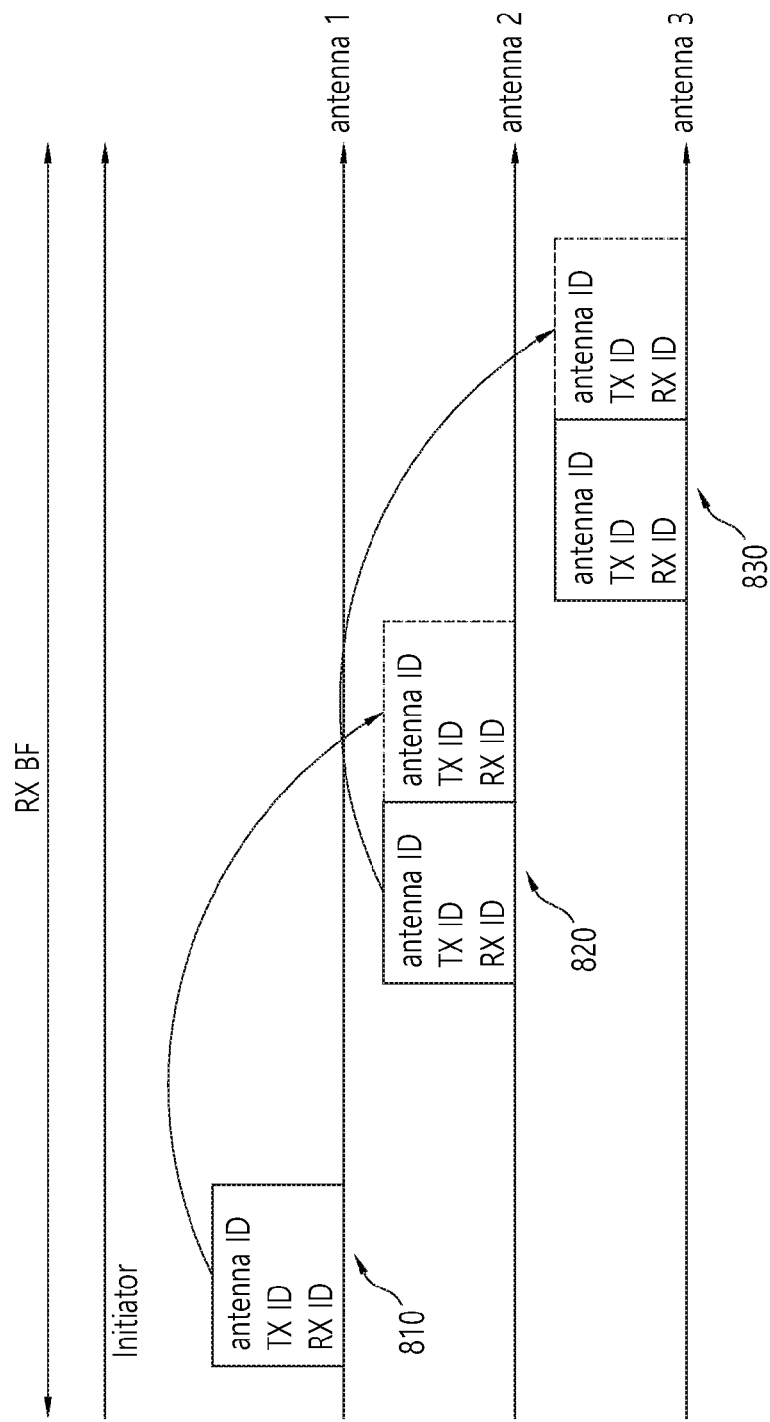
FIG. 8 is a diagram illustrating an example of sector sweep feedback in the case of a scheduling ACK type.

FIG. 8 is a diagram illustrating an example of sector sweep feedbacks in the case of a scheduling ACK type.

A responder may have three array antennas. During an RX BF interval, the responder may sequentially send a first sector sweep feedback 810 for a first array antenna, a second sector sweep feedback 820 for a second array antenna, and a third sector sweep feedback 830 for a third array antenna. Each sector sweep feedback may include a sector sweep feedback about the previously reported array antenna.

The first sector sweep feedback 810 for the first array antenna may include an antenna ID indicating the first array antenna, a TX ID and an RX ID which correspond to the antenna ID.

The second sector sweep feedback 820 for the second array antenna may include an antenna ID indicating the second array antenna, a TX ID and an RX ID which correspond to the antenna ID. In addition, the second sector sweep feedback 820 may further include a sector sweep feedback (referred to as "redundant feedback") of the previously transmitted array antenna. A redundant feedback may be provided as the difference value between a current sector sweep feedback and a previous sector sweep feedback.

For example, the first sector sweep feedback 810 may include an antenna ID=0, TX ID=2, and RX ID=1, and the second sector sweep feedback 820 may include an antenna ID=1, TX ID=3, and RX ID=3. The redundant feedback in the second sector sweep feedback 820 may include an antenna ID=1, TX ID=1, and RX ID=2.

The second sector sweep feedback 820 may further include an indicator indicating whether the redundant feedback exists. Alternatively, the second sector sweep feedback 820 may include information regarding whether the redundant feedback is provided as a difference value or an absolute value.

For example, the sector sweep feedback may include a differential antenna select field and a differential sector select field. The differential antenna select field indicates whether a redundant feedback in a corresponding sector sweep feedback is provided as a difference value between a current antenna ID and a previous antenna ID. The differential sector select field indicates whether the redundant feedback in the corresponding sector sweep feedback is provided as a difference value between a current RX/TX ID and a previous RX/TX ID.

The sector sweep feedback may include a sector sweep feedback about one or more array antennas that are previously transmitted.

Since a sector sweep feedback about an array antenna, that is previously transmitted, as well as a current array antenna is sent, the initiator may again receive a lost sector feedback even though a sector sweep feedback which is previously transmitted is lost. Accordingly, the initiator may send sector sweep ACKs for all the array antennas to responders.

Figure 9:
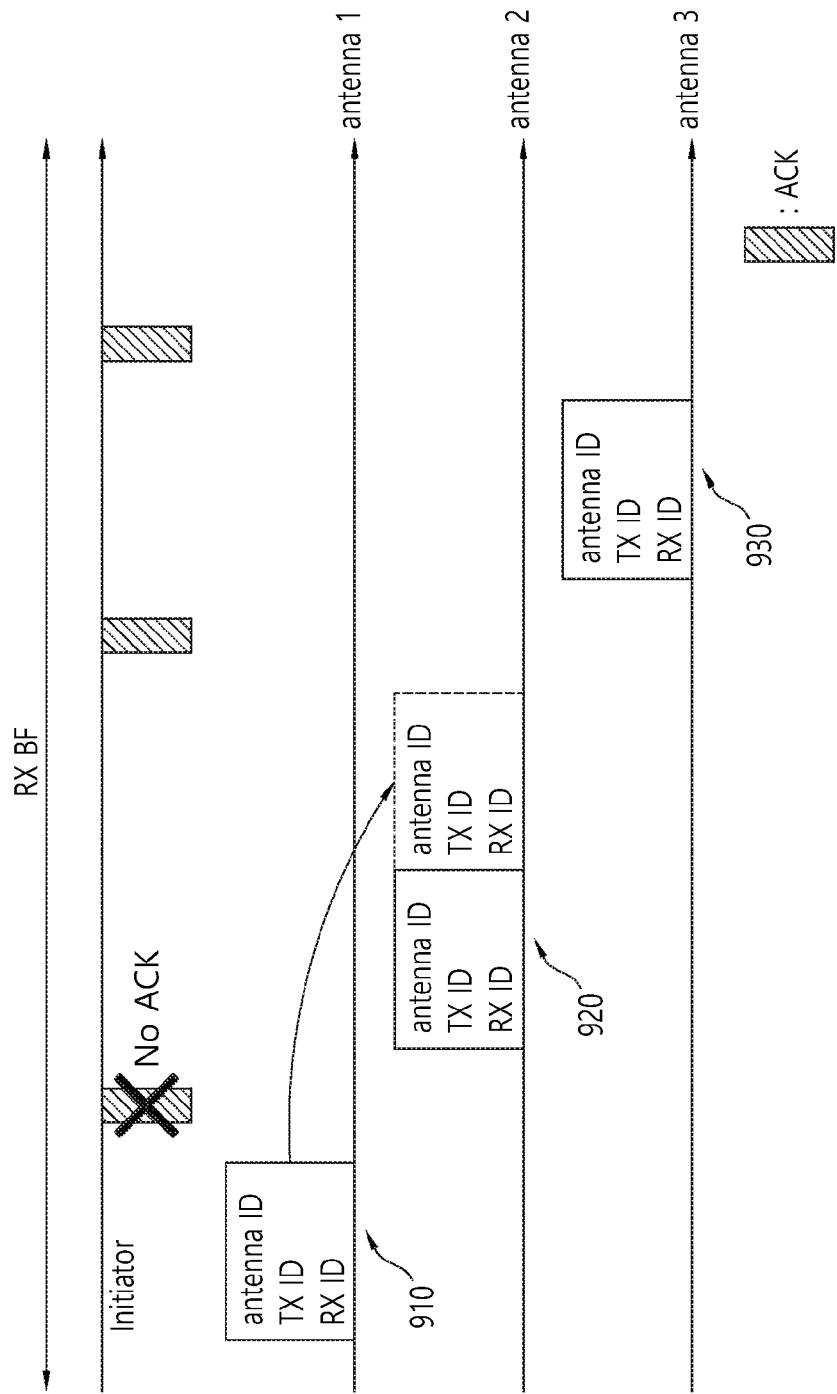
FIG. 9 is a diagram illustrating an example of sector sweep feedback in the case of an immediate ACK type.

FIG. 9 is a diagram illustrating an example of sector sweep feedbacks in the case of an immediate ACK type.

During an RX BF interval, the responder may transmit a first sector sweep feedback 910 for the first array antenna. The first sector sweep feedback 910 for the first array antenna may include an antenna ID indicating the first array antenna, a TX ID and an RX ID which correspond to the antenna ID.

A second sector sweep feedback 920 for the second array antenna may include an antenna ID indicating the second array antenna, a TX ID and an RX ID which correspond to the antenna ID. In addition, if the responder does not receive a sector sweep ACK for the first sector sweep feedback 910, the second sector sweep feedback 920 may further include a redundant feedback about an array antenna that is previously transmitted.

A third sector sweep feedback 930 for the third array antenna may include an antenna ID indicating the third array, a TX ID and an RX ID which correspond to the antenna ID. When a sector sweep ACK is received, the third sector sweep feedback 930 may not include a redundant feedback about an array antenna that is previously transmitted.

The initiator may receive sector sweep feedbacks about all the array antennas respectively. Accordingly, the initiator may send a sector sweep ACK. The responder may receive sector sweep ACKs for all the sector sweep feedbacks.

An embodiment described above may be performed for each channel. Alternatively, a sector sweep feedback and/or a sector sweep ACK may be transmitted from a specific channel (e.g., primary channel). For example, during the TX BF interval, the beacon frame may be transmitted from a secondary channel. The responder may send a sector sweep feedback about each array antenna from the primary channel. The sector sweep feedback and/or sector sweep ACK may further include information about a channel ID in which the selected sector is used.

Figure 10:
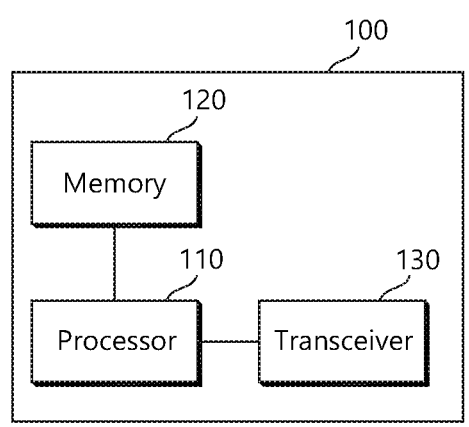
FIG. 10 is a block diagram illustrating an apparatus in which an embodiment of the present invention is implemented.

FIG. 10 is a block diagram illustrating an apparatus in which an embodiment of the present invention is implemented.

An apparatus 100 may include a processor 110, a memory 120, and a transceiver 130.

The memory 120 may be coupled to the processor 110 to store a variety of instructions that are executed by the processor 110. The transceiver 130 may be coupled to the processor 110 to transmit and/or receive a wireless (or radio) signal. The processor 110 may perform a proposed functionality, process and/or method. According to embodiments described above, an operation of the STA (an initiator or responder) may be implemented by the processor 110. When the above-described embodiments are implemented in software instructions, the software instructions may be stored in the memory 120 and may be executed by the processor 110 to perform the operation described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the aforementioned exemplary systems, methods, but is described on the basis of the flowchart as a series of steps or blocks, the present invention is not limited to the order of the steps, which steps are described above as, can occur with other steps and in a different order or simultaneously. In addition, those skilled in the art will appreciate that the steps illustrated in the flow chart may be deleted without affecting the scope of, not exclusive, a different step, or contains one or more of the steps of the flow chart the present invention.

What is claimed is:

1. A method for performing beamforming training in a wireless local area network (WLAN), the method performed by a responding device including a processor, a transceiver, a first array antenna and second array antenna, the method comprising:
   receiving a plurality of beacon frames from an initiating device through a plurality of sectors during a transmission (TX) beamforming (BF) interval,
   wherein the plurality of sectors correspond to a plurality of transmit antenna patterns for the initiating device;
   transmitting a first sector sweep feedback to the initiating device during a reception (RX) BF interval,
   wherein the first sector sweep feedback includes a first antenna identifier (ID) indicating the first array antenna and a first TX ID indicating a first TX sector determined by the responding device for the first array antenna based on the plurality of beacon frames;
   determining whether a first sector sweep acknowledgement (ACK) is received from the initiating device in response to the first sector sweep feedback; and
   transmitting a second sector sweep feedback including a redundant feedback to the initiating device during the RX BF interval if the first sector sweep ACK is not received,
   wherein the second sector sweep feedback includes a second antenna ID indicating the second array antenna and a second TX ID indicating a second TX sector determined by the responding device for the second array antenna based on the plurality of beacon frames, and
   wherein the redundant feedback includes a third antenna ID indicating the first array antenna and a third TX ID indicating the first TX sector.

2. The method of claim 1, wherein the first sector sweep feedback further includes a first RX ID indicating a first RX sector for reception from the initiating device.

3. The method of claim 1, wherein the first TX sector corresponds to one of a plurality of first transmit antenna patterns for the first array antenna, and the second TX sector corresponds to one of a plurality of second transmit antenna patterns for the second array antenna.

4. The method of claim 1, wherein the third antenna ID is set based on a difference value between a value indicated by the first antenna ID and a value indicated by the second antenna ID, and wherein the third TX ID is set based on a difference value between a value indicated by the first TX ID and a value indicated by the second TX ID.

5. The method of claim 1, wherein the second sector sweep feedback further includes information indicating a presence of the redundant feedback.

6. The method of claim 1, wherein the RX BF interval is consecutive to the TX BF interval.

7. An apparatus for performing multi-beamforming training in a wireless local area network (WLAN), the apparatus comprising:
   a transceiver configured to receive and transmit a radio signal;
   a first array antenna and second array antenna; and
   a processor connected to the transceiver and configured to:
      receive a plurality of beacon frames from an initiating device through a plurality of sectors during a transmission (TX) beamforming (BF) interval, wherein the plurality of sectors correspond to a plurality of transmit antenna patterns for the initiating device, transmit a first sector sweep feedback to the initiating device during a reception (RX) BF interval, wherein the first sector sweep feedback includes a first antenna identifier (ID) indicating the first array antenna and a first TX ID indicating a first TX sector determined by the responding device for the first array antenna based on the plurality of beacon frames, determine whether a first sector sweep acknowledgement (ACK) is received from the initiating device in response to the first sector sweep feedback, and transmit a second sector sweep feedback including a redundant feedback to the initiating device during the RX BF interval if the first sector sweep ACK is not received, wherein the second sector sweep feedback includes a second antenna ID indicating the second array antenna and a second TX ID indicating a second TX sector determined by the responding device for the second array antenna based on the plurality of beacon frames, and wherein the redundant feedback includes a third antenna ID indicating the first array antenna and a third TX ID indicating the first TX sector.

8. The apparatus of claim 7, wherein the first sector sweep feedback further includes a first RX ID indicating a first RX sector for reception from the initiating device.

9. The apparatus of claim 7, wherein the first TX sector corresponds to one of a plurality of first transmit antenna patterns for the first array antenna, and the second TX sector corresponds to one of a plurality of second transmit antenna patterns for the second array antenna.

10. The apparatus of claim 7, wherein the third antenna ID is set based on a difference value between a value indicated by the first antenna ID and a value indicated by the second antenna ID, and wherein the third TX ID is set based on a difference value between a value indicated by the first TX ID and a value indicated by the second TX ID.

11. The apparatus of claim 7, wherein the second sector sweep feedback further comprises information indicating a presence of the redundant feedback.

12. The apparatus of claim 7, wherein the RX BF interval is consecutive to the TX BF interval.

* * * * *